United States Patent [19]

Fujisawa et al.

[11] Patent Number: 5,119,083
[45] Date of Patent: Jun. 2, 1992

[54] MATRIX DISPLAY APPARATUS AND DISPLAY DATA SUPPLY CIRCUIT FOR STORING DISPLAY DATA TO BE SUPPLIED TO MATRIX DISPLAY APPARATUS

[75] Inventors: Kazuhiro Fujisawa, Fujisawa; Hiroyuki Mano; Terumi Takashi, both of Yokohama, all of Japan

[73] Assignee: Hitachi, Ltd., Tokyo, Japan

[21] Appl. No.: 378,406

[22] Filed: Jul. 11, 1989

[30] Foreign Application Priority Data

Jul. 19, 1988 [JP] Japan .................................. 63-178162

[51] Int. Cl.⁵ .............................................. G09G 3/36
[52] U.S. Cl. .................................. 340/784; 340/703; 340/701
[58] Field of Search ................ 340/701, 702, 703, 731, 340/784, 771; 358/10; 350/332, 333

[56] References Cited

U.S. PATENT DOCUMENTS

4,701,864 10/1987 Takashima et al. .................. 340/799
4,855,728 8/1989 Mano et al. .......................... 340/784
4,896,146 1/1990 Narumiya ............................. 340/703
4,990,902 2/1991 Zanda ................................... 340/771

Primary Examiner—Ulysses Weldon
Assistant Examiner—Doon Yue Chow

[57] ABSTRACT

In accordance with a write address successively updated in synchronism with a dot clock, color display data is written into a memory. The memory includes three memory corresponding to three primary colors and having identical addresses thereto assigned. For the purpose of color display, the written display data is read out three times consecutively during one write clock interval. A read address generator for supplying a read address successively changed to the memory is reset when addresses have been generated up to the number of horizontal display dots. The resetting is performed when the number of horizontal display dots detected from the dot clock and a display timing signal has coincided with a read address signal outputted from the read address generator. Since the reset timing of the read address generator changes according to the number of horizontal display dots detected by horizontal display dot number detector, it is possible to cope with a change of the personal computer supplying input data without changing the circuit.

13 Claims, 9 Drawing Sheets

MATRIX DISPLAY APPARATUS AND DISPLAY DATA SUPPLY CIRCUIT FOR STORING DISPLAY DATA TO BE SUPPLIED TO MATRIX DISPLAY APPARATUS

BACKGROUND OF THE INVENTION

The present invention relates to a matrix display apparatus such as a liquid crystal display or a plasma display, and in particular to a display data supply circuit used for the matrix display apparatus.

In a color liquid crystal display apparatus, three rasters or three lines corresponding to three primary colors comprising Red, Green and Blue represent one horizontal row on a display unit as described in JP-A-56-92592. Data are written into a liquid crystal panel one raster or one line at a time. For displaying one now on the display unit, therefore, it is necessary to temporarily store inputted R, G and B color display data into a memory and supply separately the stored color display data to the liquid crystal display panel one raster or one line at a time (in other words, color by color). The number of horizontal display dots of a supply source for supplying these display data must be equal to the number of horizontal display dots in the liquid crystal display panel. When the supply source of display data was changed and the number of horizontal display dots was changed, therefore, the read address generator circuit had to be changed so as to generate as many addresses as the new number of dots supplied from the source.

In order to facilitate understanding the concept of the present invention, a liquid crystal display apparatus derived by the present inventors in the course of obtaining the present invention will now be described in detail by referring to FIGS. 1 to 3.

Figure 1:
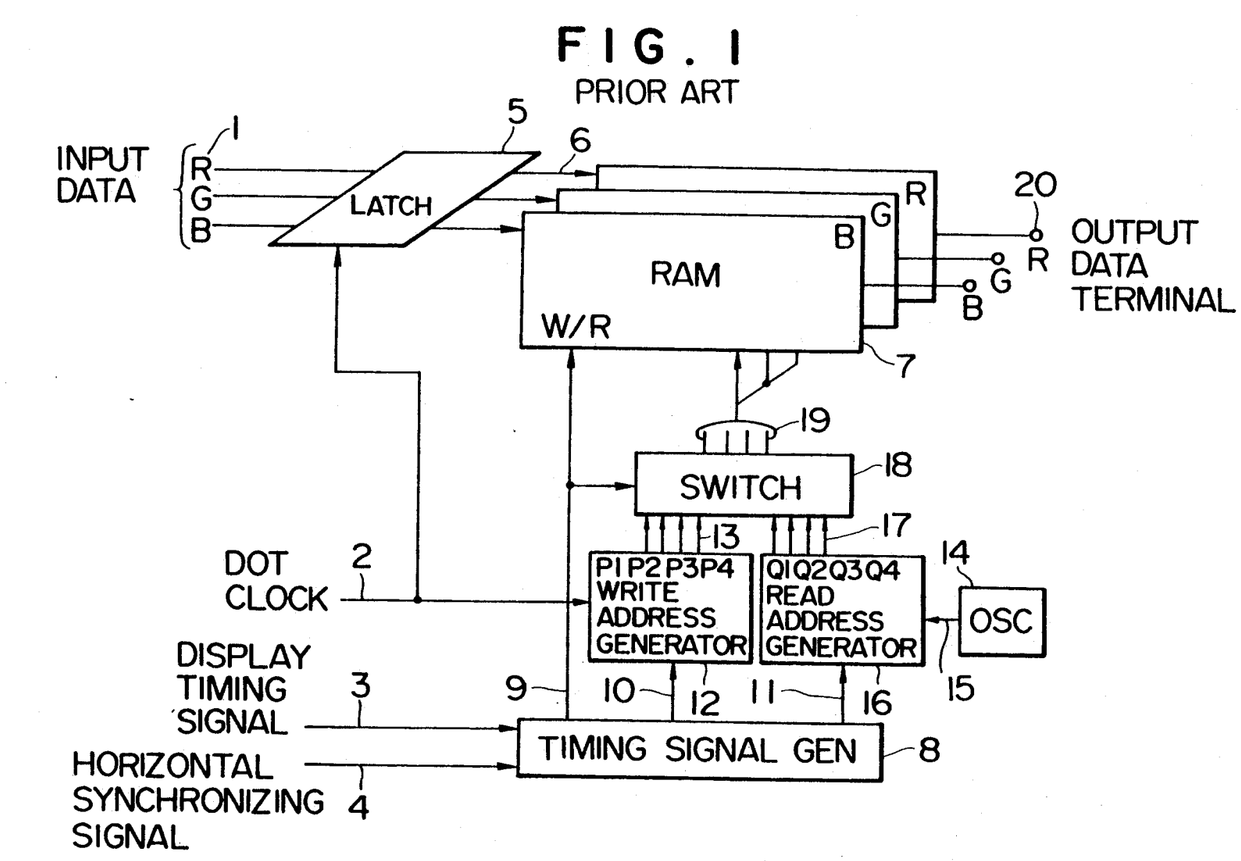
FIG. 1 is a circuit diagram of a display data supply section in a color liquid crystal display apparatus.

FIG. 1 shows a row memory write and read section in the color liquid crystal display apparatus.

After display data fed from a data supply source are latched in a latch 5, the display data are stored into a row memory 7, read out from the row memory in accordance with an address supplied from a read address generator 16, and supplied to a liquid crystal panel connected to an output terminal 20. The output data supplied to the liquid crystal panel are selected in the order of Red, Green and Blue, supplied to an X-driver circuit, and written into the liquid crystal panel one line at a time.

On the basis of a display timing signal 3 and a horizontal synchronizing signal 4, a timing signal generator produces a write start signal 10 for starting to write data into the memory 7 and a read start signal 11 for starting to read data from the RAM 7 as shown in FIG. 3.

A write/read signal 9 is a signal which changes alternately to a "high" level and a "low" level by using rise timing of a dot clock 2 according to the variation of the horizontal synchronizing signal 4. The write start signal 10 is a signal generating a "high" level pulse when the display timing signal 3 has become a "high" level. The read start signal 11 is a signal generating a "high" level pulse by using a falling edge of a read clock 15 after the horizontal synchronizing signal 4 has been inputted (i.e., after the horizontal synchronizing signal 4 has become low.

A write address signal 13 fed from write address generator means 12 is cleared by the write start signal 10 and generates a write address 13 which counts up upon each rising edge of a dot clock 2. In order to perform the read operation three times during one horizontal interval, an oscillator 14 generates a read clock 15 having a period equivalent to one third of that of the dot clock 2.

A read address signal 17 fed from read address generator means 16 is cleared by the read start signal 11 to count up upon each rising edge of the read clock 15. When a write/read signal 9 is a "high" level, switch means 18 outputs the write address 13 onto an address means 19 of the RAM 7. When a write/read signal 9 is a "low" level, the switch means outputs the read address 17 onto the address 19 of the RAM 7.

Figure 2:
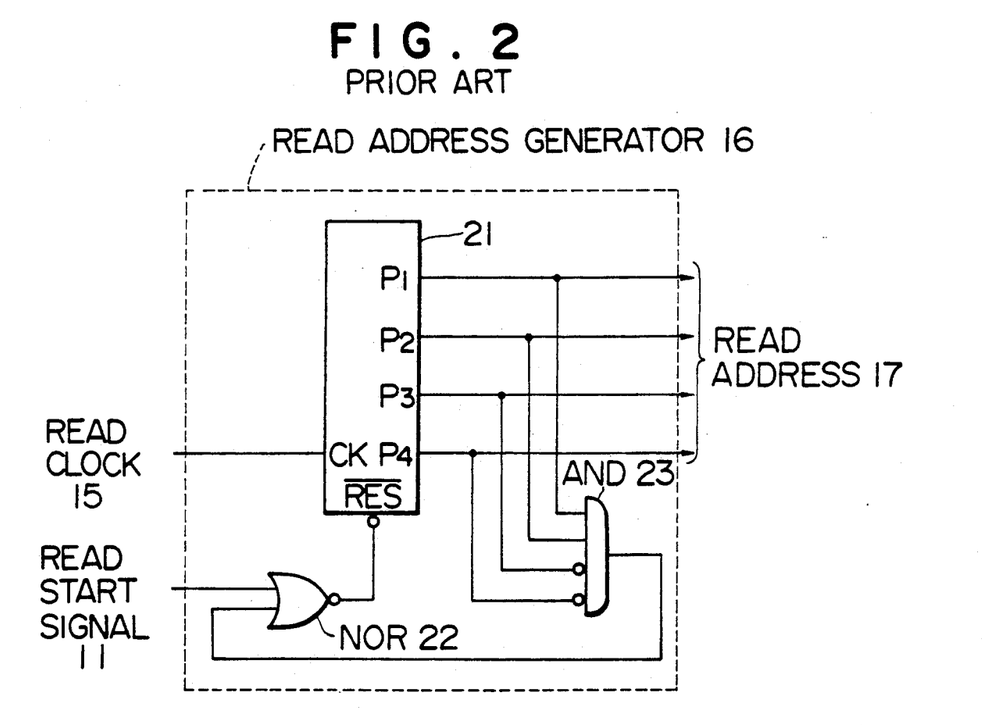
FIG. 2 is a circuit diagram of read address generator means shown, in FIG. 1.
Figures 3A, 3B:
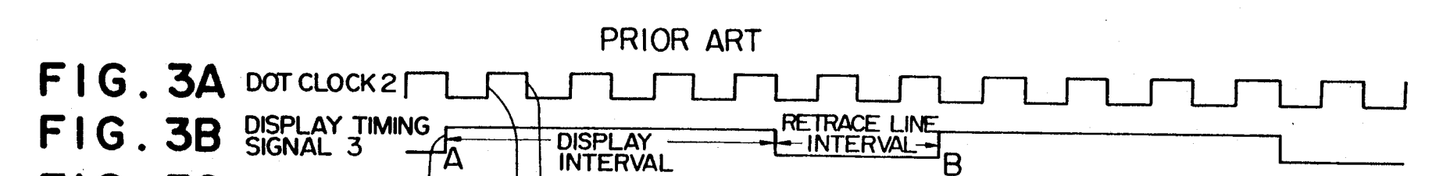
Figures 3C, 3D:
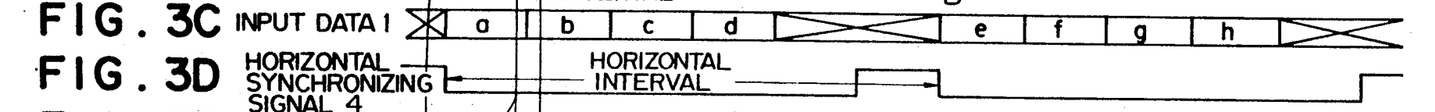
Figure 3E:
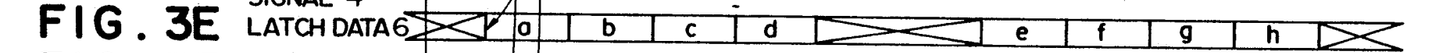
Figure 3F:
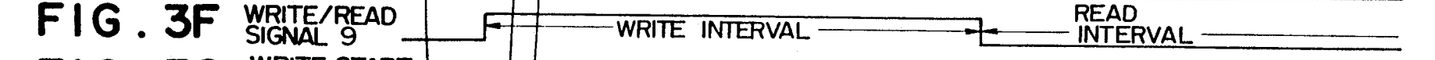
Figure 3G:
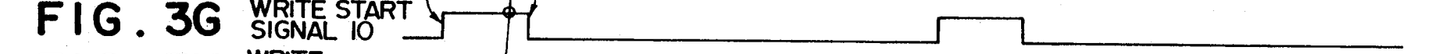
Figure 3H:
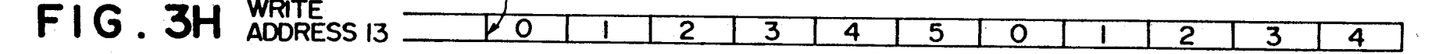
Figure 3I:
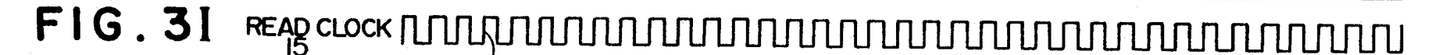
Figure 3J:
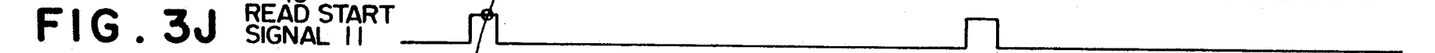
Figure 3K:
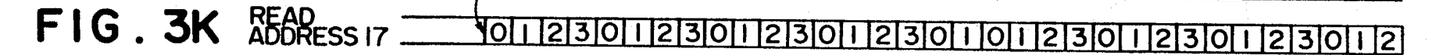
Figure 3L:
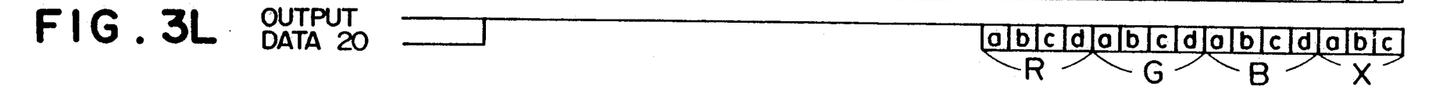

FIG. 2 is an internal block diagram of the above described read address generator means 16. The read address generator means 16 comprises a counter 21, a NOR circuit and an AND circuit 23. The number of horizontal display dots is arbitrarily decided according to the size of the display panel and is, say, 640 dots. Supposing that the number of horizontal display dots is 4 in order to make the description of drawings easily understandable, operation of the circuit will be hereafter described in detail. When the counter 21 in the read address generator means 16 outputs a count equivalent to 3 = (the number of horizontal display dots) − 1, the AND circuit 23 outputs a "high" level, which resets the counter 21 via the NOR circuit 22. While as many read clocks as horizontal display dots are being applied, therefore, the read address 17 of FIG. 1 makes a round. As understood from FIG. 2, it is necessary in this circuit to change the logic state of input terminals of the AND circuit 23 according to the number of horizontal display characters.

FIG. 3 is a timing chart showing the operation of the circuit shown in FIG. 1.

The operation of the circuit shown in FIG. 1 will now be described by referring to FIG. 3.

Input data 1 are latched by latch means 5 upon each rising edge of the dot clock 2 (FIG. 3E). These latched data 6 are supplied to data input terminals of the RAM 7.

When the display timing signal 3 becomes a "high" level at each of points A and B, the timing signal generator means 8 makes the write start signal 10 a "high level". Upon a succeeding falling edge of the dot clock 2, the timing signal generator means 8 makes the write start signal 10 a "low" level. The write address generator means 12 is thus reset.

Whenever the dot clock rises, the write address generator means 12 counts up addresses. In this way, the write address 13 is successively increased by the dot clock 2.

While at this time the write/read signal 9 is a "high" level corresponding to one horizontal interval, the RAM 7 is brought into the write mode. At the same time, the write address 13 is outputted on the address 19 and supplied to address terminals of the RAM 7 by the switch means 18. The latch data 6 are successively written into the RAM 7 until the write/read signal 9 becomes the "low" level.

On the other hand, the timing generator means 8 generates the read start signal 11. Upon rise timing of the read clock, the read address generator means 16 is reset. After the read address generator means 16 has been reset, the read address generator means 16 counts up the read clocks 15 and outputs the read address 17. Corresponding to the next horizontal interval, the write/read signal 9 becomes the "low" level and hence the RAM 7 is brought into the read mode. Along therewith, the read address 17 is outputted onto the address 19 and supplied to the address specifying terminals of the RAM 7. During every other horizontal interval, signals corresponding to the latch data 6 written into the RAM 7 during the previous horizontal interval are successively read out as output data 20.

In this case, the read clock 15 has a period equivalent to one third of that of the dot clock 2. In addition, the read address generator means 16 is reset by an address preset in the AND circuit 23 because of the configuration shown in FIG. 2. Therefore, display data R, G and B and data X which are not displayed on the liquid crystal display device during one horizontal interval are read from the RAM 7.

In the configuration described above, a counter so fixed as to make a round while counting a predetermined number of horizontal display dots is used. When the connected supply source is changed and the number of display dots is changed, therefore, the read address generator circuit must be changed.

SUMMARY OF THE INVENTION

An object of the present invention is to provide a matrix display apparatus such as a liquid crystal display apparatus in which the number of horizontal display dots can be arbitrarily changed according to the number of horizontal display dots of the supply source.

Another object of the present invention is to provide a display data supply apparatus capable of supplying an arbitrarily changeable number of horizontal display dots to a matrix display apparatus such as an electroluminescence display apparatus and a plasma display apparatus.

A display data supply apparatus of the present invention comprises memory means for storing therein display data, write address generator means for successively updating a write address in synchronism with a dot clock and supplying the write address thus updated to the memory means, read address generator means for supplying a read address successively changed to the memory means, timing signal generator means responsive to a display timing signal supplied from outside to supply a timing signal for controlling the read/write switching of the memory means to the memory means, the write address generator means and the read address generator means, horizontal display dot number detector means for detecting the number of horizontal display dots out of the above described dot clock and the above described display timing signal, and reset means for resetting the read address generator means upon coincidence between a read address signal outputted from the above described read address generator means and the above described number of horizontal display dots.

Further, in a matrix display apparatus of the present invention, the above described display data supply apparatus is connected to a display panel.

According to the number of horizontal display dots detected by the horizontal display dot number detector means, reset timing of the read address generator means is changed. Even if a personal computer or the like supplying input data is changed, therefore, it is possible to cope with the change without changing the circuit.

BRIEF DESCRIPTION OF THE DRAWINGS

FIGS. 3A to 3L are operation time charts of the circuit shown in FIG. 1.

FIGS. 9A to 9K are operation time charts of the circuit shown in FIG. 8.

DESCRIPTION OF THE PREFERRED EMBODIMENTS

Figure 4:
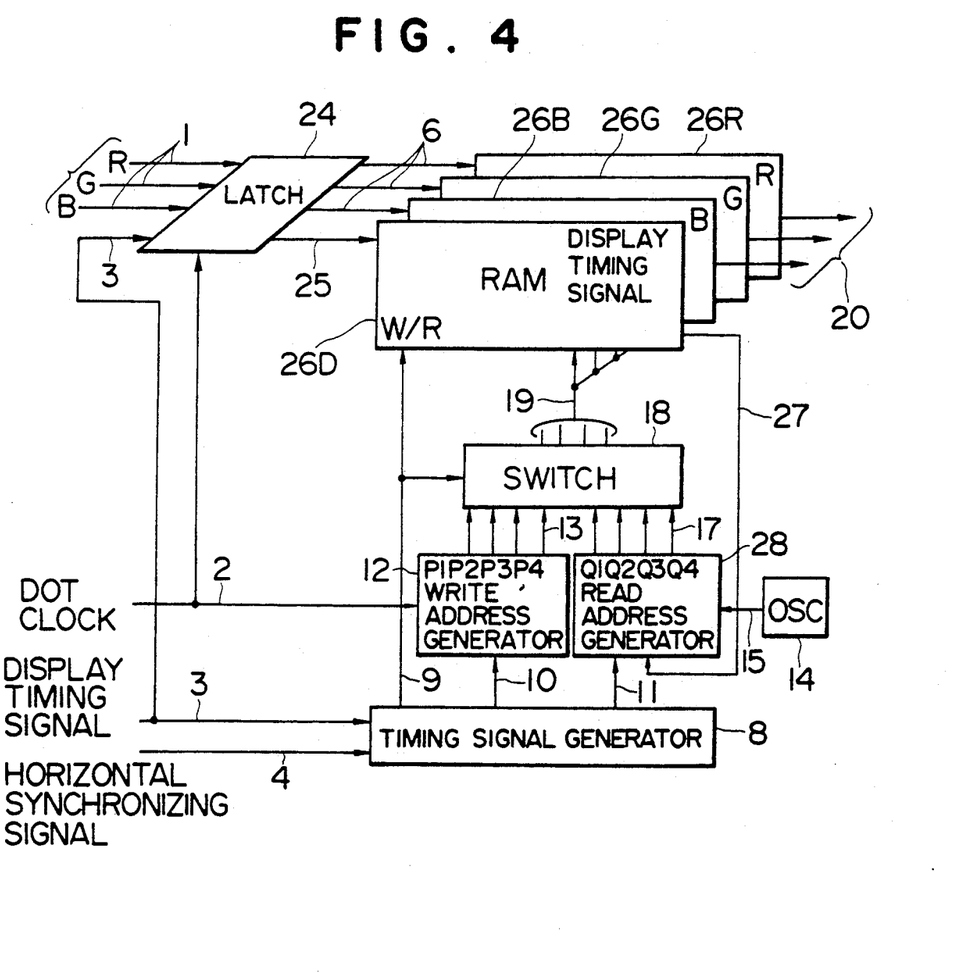
FIG. 4 is a circuit diagram of an embodiment of a display data supply apparatus according to the present invention.
Figure 8:
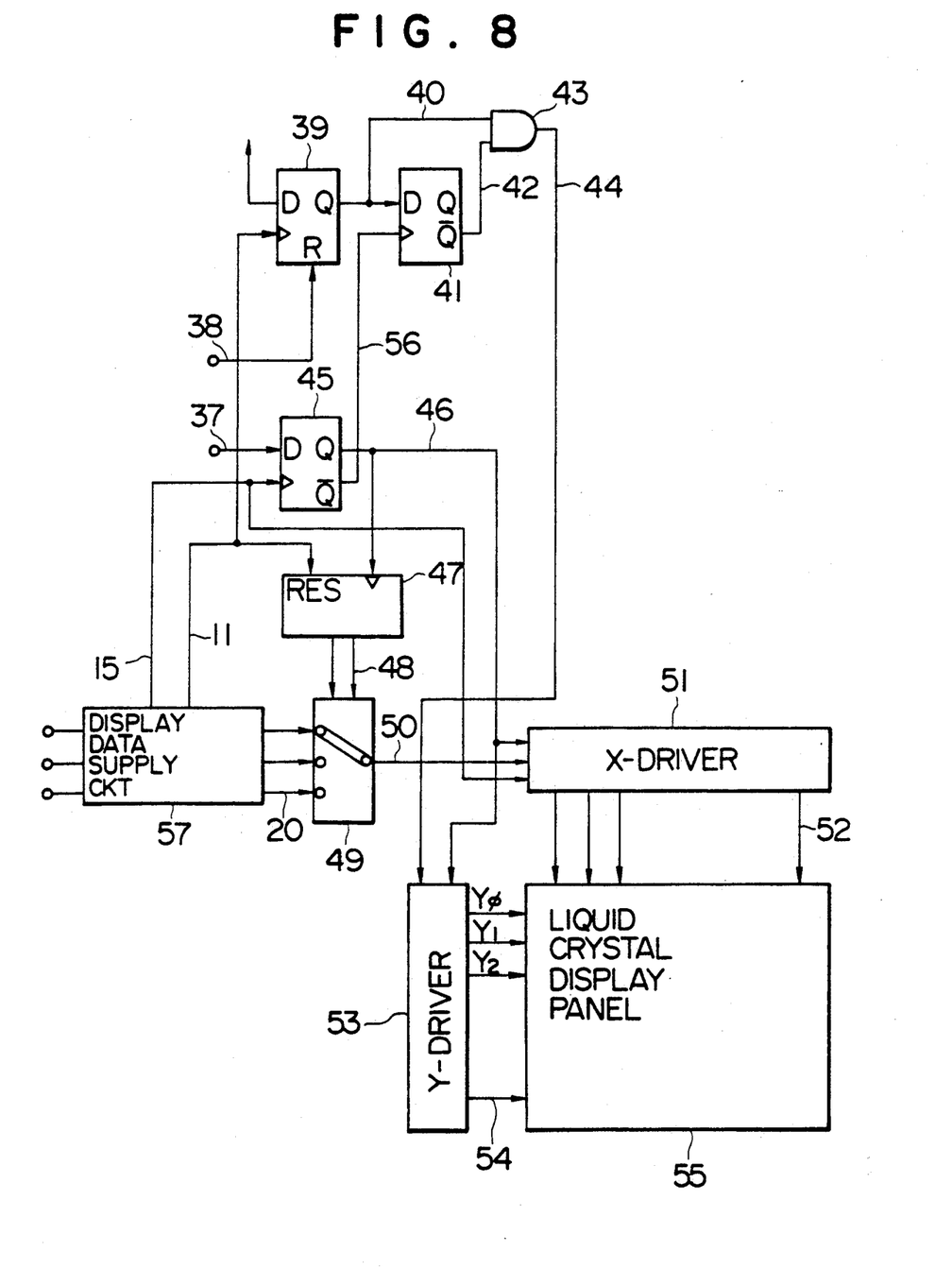
FIG. 8 is a circuit diagram of an embodiment of a matrix display apparatus according to the present invention.

FIG. 4 is a circuit diagram of an embodiment of a display data supply circuit according to the present invention. FIG. 8 is a circuit diagram of a color liquid crystal display apparatus which is an embodiment of a matrix display apparatus incorporating the display data supply circuit of FIG. 4.

First of all, the display data supply circuit will now be described.

For convenience of description, it is now assumed that every other horizontal interval is used as the display interval in the color liquid crystal display apparatus, and the number of horizontal display dots is four.

Figure 5:
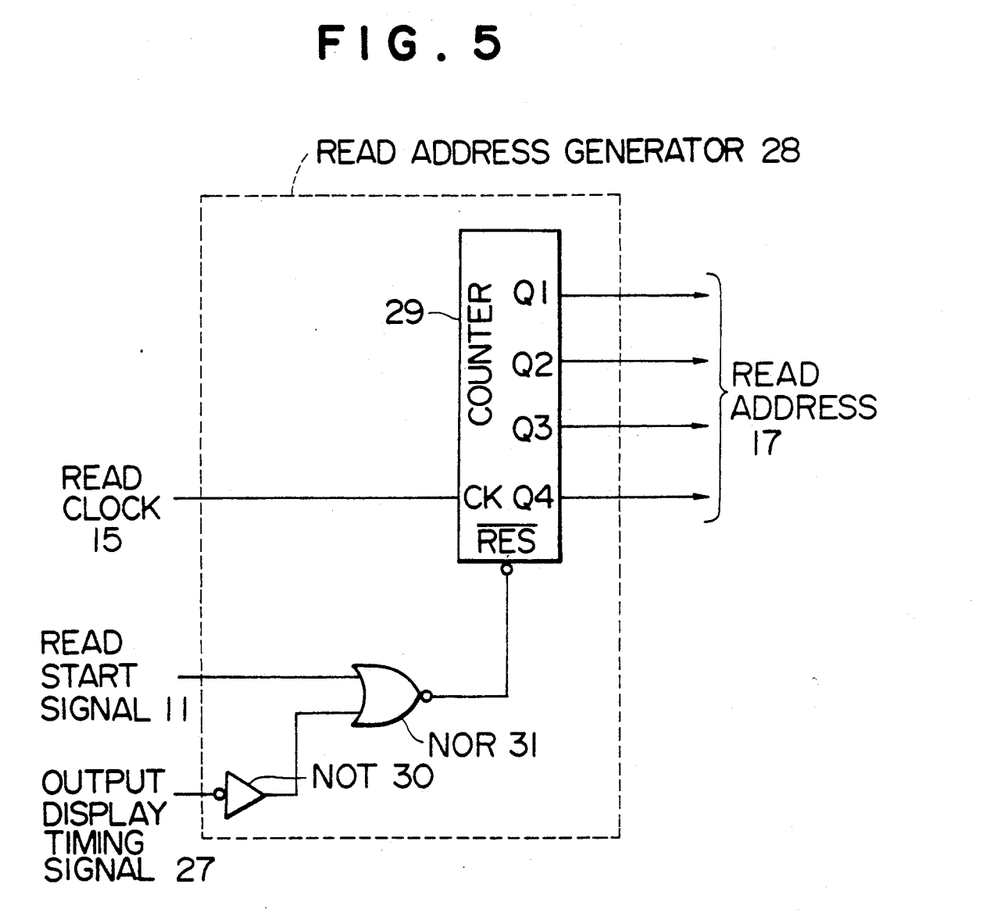
FIG. 5 is a circuit diagram of read address generator means shown in FIG. 4.

Numerals 1 to 4, 6, 8 to 15 and 17 to 20 denote the same components as those of FIG. 5.

Latch means 24 latches the input data 1 and the display timing signal in synchronism with the dot clock. A latch display timing signal 25 obtained by latching the display timing signal 3 in the latch means 24 and latch data 6 are supplied to a random access memory (RAM) 26. The RAM 26 comprises N first memories 26R, 26G and 26B respectively for memorizing latch data 6 of N colors R, G and B and a second memory 26D whereto the same addresses as those of the first memories 26R, 26G and 26B are assigned.

In the second memory 26D, the latch display timing signal 25 is written into the same address as that of the latch data 6 in the first memories 26R, 26G and 26B. When the display timing signal is a "high" level, data of logic 1 are written into the second memory 26D. When the display timing signal is a "low" level, data of logic 0 are written into the second memory 26D. Therefore, the difference Y (shown in FIG. 6N) between the address whereat data stored in the second memory 26D have changed from a logic 0 to a logic 1 and the address whereat data stored in the second memory 26D have changed from a logic 1 to a logic 0 indicates the number of horizontal display dots, or 4 in this case.

According to a read address supplied from read address generator means 28, a display timing signal is read out from the second memory 26D. This is referred to as output display timing signal 27.

The read address generator means 28 is reset by a "low" level of the output display timing signal 27 or a "high" level of the read start signal 11. The read address generator means 28 counts up rising edges of the read clock 15 to produce the read address 17.

FIG. 5 is an internal block diagram of the above described read address generator means 28. The read address generator means 28 comprises a counter 29, a NOT circuit 30 and a NOR circuit 31. The counter 29 is reset when the output display timing signal 27 has become a "low" level or when the read start signal 11 has become a "high" level, thereby the read address generator means being reset.

FIG. 6 is a time chart showing the operation of the circuit illustrated in FIG. 4.

Figure 6A:
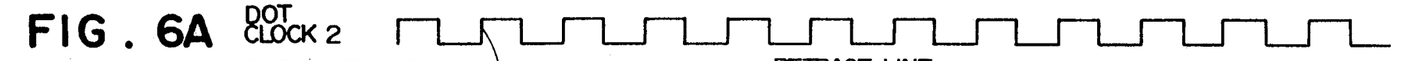
FIGS. 6A to 6N are operation time charts of the circuit shown in FIG. 4.
Figures 6B, 6C:
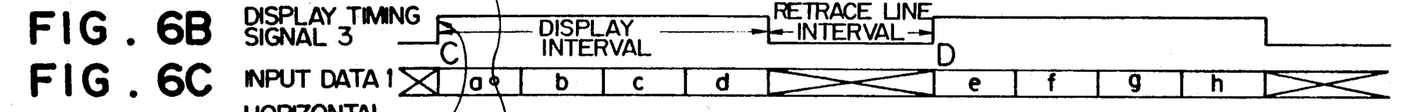
Figure 6D:
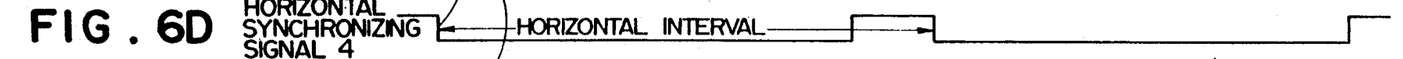
Figure 6E:
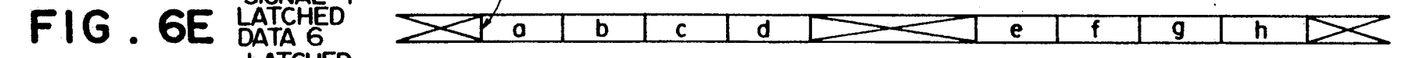
Figure 6F:
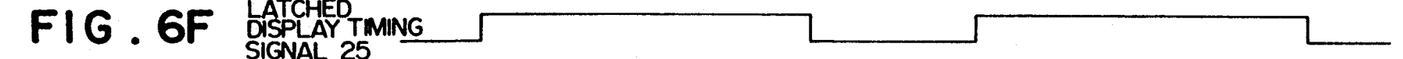
Figure 6G:
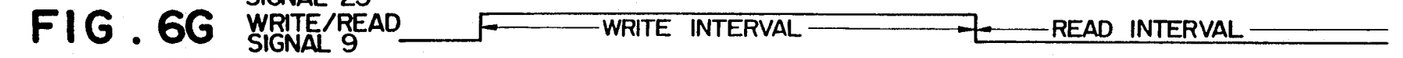
Figure 6H:
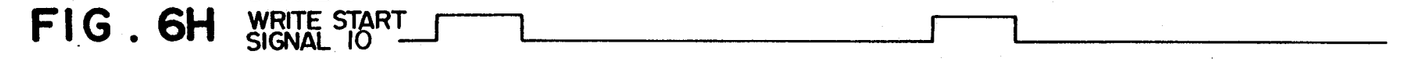
Figure 6I:
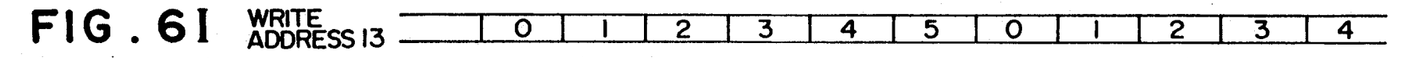
Figure 6J:
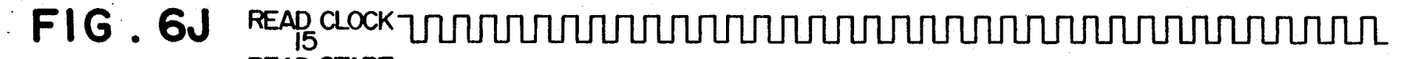
Figures 6K, 6L:
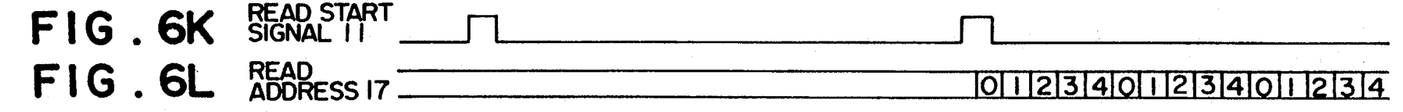
Figure 6M:
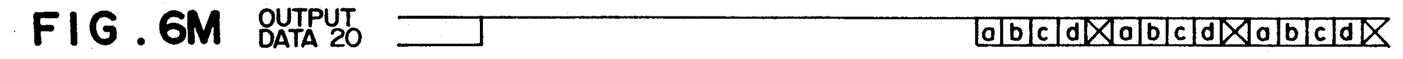
Figure 6N:
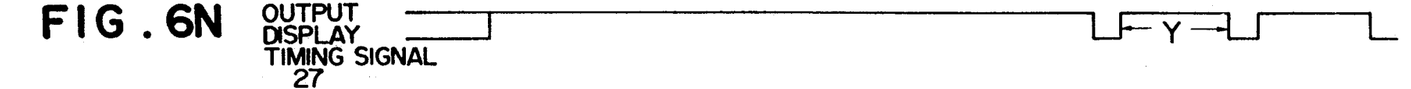

Operation of the circuits shown in FIGS. 4 and 5 will now be described by referring to FIG. 6.

Upon a rising edge of the dot clock 2, the input data 1 and the display timing signal 3 are latched by the latch means 24. Latched data 6 thus latched and the latch display timing signal 25 are supplied to data input terminals of the RAM 26.

When the display timing signal 3 becomes a "high" level at points C and D in synchronism with a falling edge of the horizontal synchronizing signal 4, the timing signal generator means 8 outputs the write start signal 10 and resets the write address generator means 12. The write address 13 is successively increased by the dot clock 2. If at this time the write/read signal 9 is in a "high" level interval, the RAM 26 is brought into the write mode. At the same time, the write address 13 is outputted onto the address 19 by the switch means 18 and supplied to address terminals of the RAM 26. The latch data 6 and the latch display timing signal 25 are simultaneously and successively written into the RAM 26 until the write/read signal 9 becomes a "low" level.

When the horizontal synchronizing signal 4 is inputted, the timing signal generator means 8 generates the read start signal 11 and resets the read address generator means 28. After the read address generator means 28 has been reset, it successively counts up the read clocks 15 and outputs the read address 17. When the write/read signal 9 has become a "low" level in synchronism with the horizontal synchronizing signal 4, the RAM 26 is brought into the read mode, and the read address 17 is outputted onto the address 19 by the switch means 18 and supplied to address specifying terminals of the RAM 26. During every other horizontal synchronizing signal interval, output data 20 and the output display timing signal 27 corresponding to the latch data and the latch display timing signal 25 written during the previous horizontal interval are successively read out from the RAM 26.

When in this case the latched data 6 become different from data to be displayed on the liquid crystal display apparatus at write timing as shown in FIG. 6, the latch display timing signal 25 becomes a "low" level. Correspondingly thereto, the output display timing signal 27 becomes a "low" level at the read timing, and the read address generator means 28 is reset. As a result, the read address 17 makes a round while as many horizontal display dots as determined by the number of horizontal display dots of the input data 1 instead of the number of horizontal dots fixed by the hardware.

Since the read clock 15 has a period equivalent to one third of that of the dot clock 2, data are consecutively read out from the RAM 26 three times or more for the purpose of color display, the output data 20 being thus outputted. The ratio of a period of the dot clock 2 to a period of the read clock 15 may be an integer other than 3 in accordance with a dot configuration.

Figure 7:
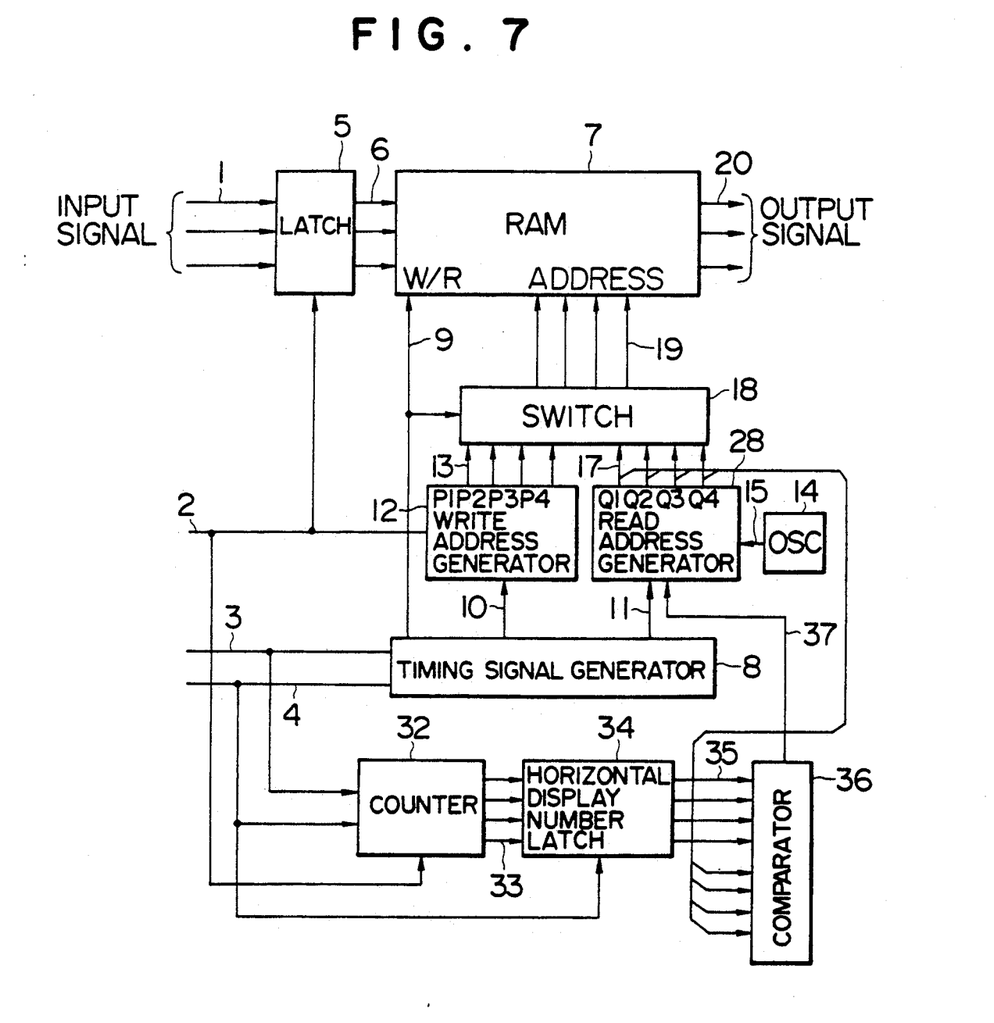
FIG. 7 is a circuit diagram of another embodiment of a display data supply apparatus according to the present invention.

FIG. 7 is a block diagram showing another embodiment of a display data supply apparatus according to the present invention. The same numerals as those of FIGS. 4 and 1 denote identical components.

Counter means 32 is reset by a falling edge of the horizontal synchronizing signal 4. When the display timing signal 3 is a "high" level, the counter means counts up the dot clocks 2 and outputs a signal 33 indicating the number of horizontal display dots.

Horizontal display dot number latch means 34 latches number 33 of horizontal display dots at a rising edge of the horizontal synchronizing signal 4, and outputs latched number 35 of horizontal display dots. Comparator means compares the latched number 35 of horizontal display dots with the read address 17. When the latched number 35 of horizontal display dots is equal to the read address 17, the comparator means 36 outputs a "low" level on a comparator output 37.

In FIG. 7, data are written into the RAM 7 in the same way as FIG. 1. Here, the counter means 32 is cleared by a falling edge of the horizontal synchronizing signal 4. When the display timing signal 3 is a "high" level, the counter means 32 counts clocks of the dot clock 2. When the display timing signal 3 becomes a "low" level, the counter means 32 stops counting up. When a rising edge of the horizontal synchronizing signal 4 is inputted, the horizontal display dot number latch means 34 latches the number 33 of horizontal display dots. Until the next rising edge of the horizontal synchronizing signal 4 is inputted, i.e., while the output data 20 is being displayed, the horizontal display dot number latch means 34 outputs the latched number 35 of horizontal display dots to the comparator means 36.

On the other hand, readout operation is performed in the same way as FIG. 4. When the read address 17 becomes equal to the latched number 35 of horizontal display dots, the comparator means 36 outputs a "low" level signal onto the comparator output 37 to reset the read address generator means 28. As a result, operation similar to that of FIG. 4 is performed. For the purpose of color display, data are read out from the RAM 7 three times or more during one horizontal period.

In the two embodiments heretofore described, display is performed only once in two horizontal intervals. If two RAMs are so used that the read operation may be performed alternately and the write operation may be performed alternately every other horizontal interval, however, display can be performed in all horizontal intervals.

An embodiment in which a display data supply circuit according to the present invention is connected to a liquid crystal display panel will now be described.

FIG. 8 shows a circuit which receives the display data 20 outputted by the display data supply circuit of FIG. 4 or FIG. 7 and which displays the display data 20 on the liquid crystal display panel.

A flip-flop 45 latches the comparator output 37 at a rising edge of the read clock 15. An output 46 of the flip-flop 45 is a horizontal clock signal having three pulses in one horizontal interval.

The horizontal clock signal 46 is inputted to a counter 47. The counter 47 counts up rising edges of the horizontal clock signal and outputs the count on a count output 48. The counter 47 is reset by the read start signal 11 supplied from a display data supply circuit 57.

A selector 49 selects "Red" from the output data 20 when the count 48 is 0, selects "Green" when the count 48 is 1, and selects "Blue" when the count 48 is 2. The count value thus selected is supplied to an X-driver 51 for driving X-direction signal lines of a liquid crystal display panel 55 as display data 50.

The X-driver 51 takes the liquid crystal display data 50 successively into its internal line memory upon read clocks. Upon a rising edge of the horizontal clock 46, the X-driver 51 outputs all of the data thus taken into the liquid crystal display panel 55 simultaneously as an X-drive signal 52.

A flip-flop 39 is reset by a vertical synchronizing signal 38. Upon a rising edge of the read start signal 11, the flip-flop 39 is set to output a display start signal 40 to a flip-flop 41.

The flip-flop 41 latches the display start signal 40 at a rising edge of an inverted horizontal clock 56 to output a latched display start signal 42. An AND circuit 43 is supplied with the display start signal 40 and the latched display start signal 42. When both the display start signal 40 and the latched display start signal 42 are "high" levels, the AND circuit 43 outputs a "high" level as first line marker (hereafter abbreviated to FLM) 44.

A Y-driver 53 is supplied with the FLM 44. Upon a rising edge of the horizontal clock 46, the Y-driver 53 takes in the FLM 44. Upon the rising edge of a succeedingly inputted clock of the horizontal clock 46, the Y-driver 53 shifts the data of FLM 44 thus taken in and outputs a Y drive signal 54.

The liquid crystal display panel 55 is supplied with the X-drive signal 52 and the Y-drive signal 54. At a location where both signals are "1", display turns on. At other locations display turns off.

On the surface of the liquid crystal display panel 55, red, green and blue lateral stripe-shaped color filters are arranged in order cited beginning from the first line.

FIG. 9 is a time chart showing signal waveforms at various portions of the circuit of FIG. 8.

Figures 9A, 9B, 9C:
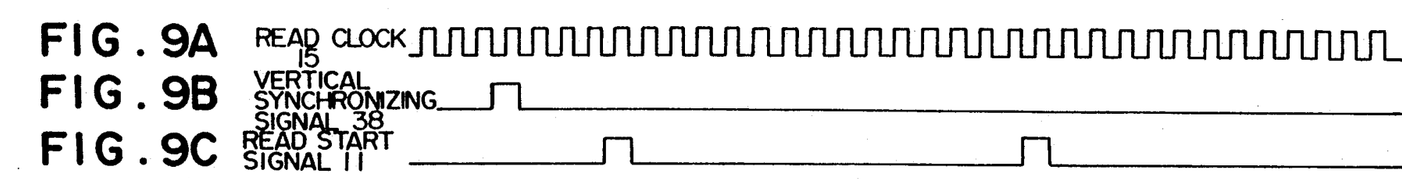
Figure 9D:
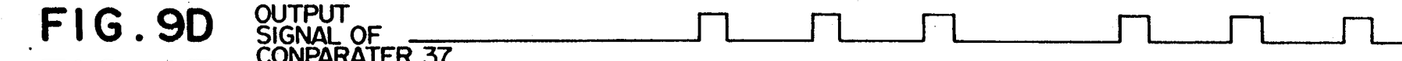
Figure 9E:
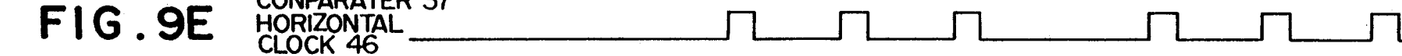
Figure 9F:
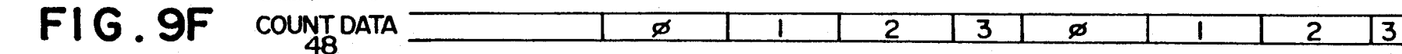
Figure 9G:
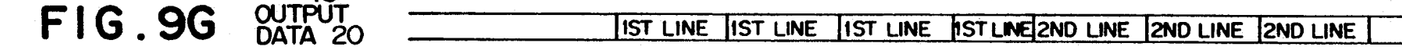
Figure 9H:
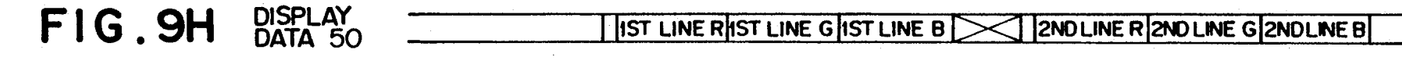
Figure 9I:
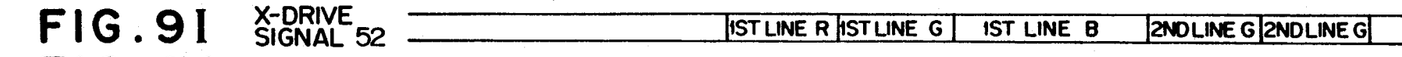
Figure 9J:
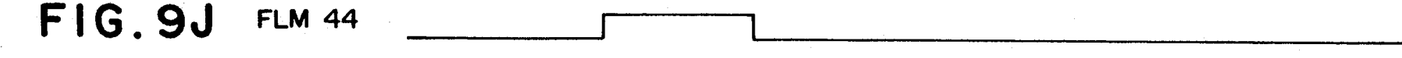
Figure 9K:
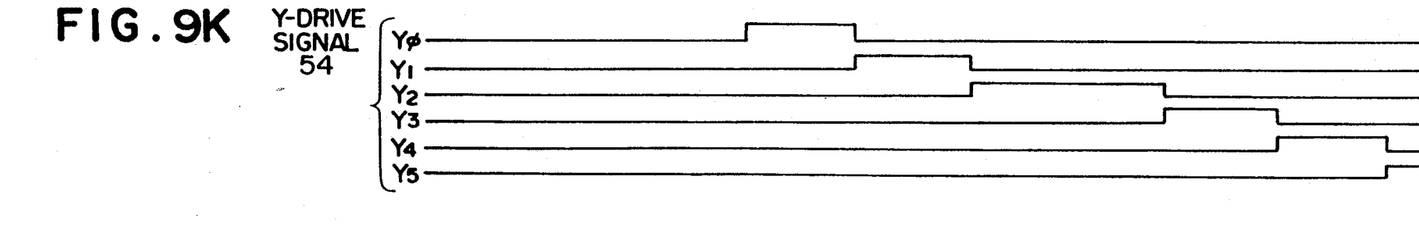

Operation of the circuit shown in FIG. 8 will now be described by referring to FIG. 9.

When the read start signal 11 is inputted from the timing signal generator circuit 8 included in the display data supply circuit 57, the counter 47 is reset, and the count 48 becomes 0. Thereby, only "Red" data are selected out of the output data 20 onto the liquid crystal display data 50. The "Red" data outputted on the liquid crystal display data 50 are taken into the X-driver means 51 in synchronism with the read clock 15. Upon the next rising edge of the horizontal clock 46, respective bits are outputted simultaneously as the X-drive signal 52. Upon a rising edge of the horizontal clock 46, the counter 47 counts up by one, and the count 48 becomes 1. Accordingly, "Green" data are outputted onto the liquid crystal display data 50, inputted into the X-driver means 51, and outputted from the X-driver means 51 upon the rising edge of a succeeding clock of the horizontal clock 46. This operation is shown in FIG. 9. In this way, data of one line are divided into "Red", "Green" and "Blue" and outputted onto the X-drive signal lines.

On the other hand, the Y-driver means 53 takes in the FLM 44, which lasts from the rising edge of the read start signal 11 immediately following input of the vertical synchronizing signal 38 until the falling edge of the horizontal clock 46 as shown in FIG. 9, in response to a rising edge of the horizontal clock 46 and outputs the FLM 44 onto Y0 of the Y-drive signal 54. Whenever the horizontal clock 46 is inputted thereafter, the output is successively shifted in order of Y1, Y2 and so on. Lines of the color liquid crystal 55 of lateral stripe matrix type are thus selected successively beginning from the first line. In this way, display on the color liquid crystal of lateral stripe matrix type is performed. As heretofore described, the present invention makes it possible to display a display signal having an arbitrary number of horizontal dots in the range of the line memory capacity. Therefore, it is not necessary to modify the circuit whenever the number of horizontal dots of the display input signal is changed.

We claim:

1. A display control apparatus supplied with a dot matrix display data signal to be displayed in a matrix form, a dot clock signal for providing timing according to each dot matrix on a display of said display data signal, a display timing signal for providing timing of read/write mode switching of the display data, and a display synchronizing signal for providing timing in the horizontal direction of raster display of the display data, said display control apparatus being used to generate a memory read address and a memory write address for said display data, said display control apparatus comprising:
   (a) oscillator means for providing a read clock having a frequency equivalent to or multiple times as large as that of said dot clock signal;
   (b) counter means for providing said memory read address by counting clock pulses of said read clock;
   (c) RAM means for storing therein variation of said display timing signal; and
   (d) means so provided with a signal fed from said RAM means as to reset said counter means and thereby reset the memory read address.

2. A display control apparatus supplied with a dot matrix display data signal to be displayed in a matrix form, a dot clock signal for providing timing according to each dot matrix on a display of said display data signal, a display timing signal for providing timing of read/write mode switching of the display data, and a display synchronizing signal for providing timing in the horizontal direction of raster display of the display data, said display control apparatus being used to generate a memory read address and a memory write address for said display data, said display control apparatus comprising:
   (a) memory means for storing therein the display data;
   (b) write address generator means for successively updating the write address in synchronism with the dot clock and for supplying the write address thus updated to said memory means;
   (c) read address generator means for supplying the read address successively changed to said memory means;
   (d) timing signal generator means responsive to the display timing signal to supply a timing signal for controlling the read/write switching of said memory means to said memory means, said write address generator means and said read address generator means;
   (e) horizontal display dot number detector means for detecting the number of horizontal display dots from said dot clock and said display timing signal; and
   (f) reset means for resetting the read address generator means upon coincidence between the read address signal outputted from said read address generator means and said number of horizontal display dots.

3. A display control apparatus according to claim 2 comprising:
said horizontal display dot number detector means including a second memory means having the same addresses as those of said memory means storing therein said display data assigned thereto, said horizontal display dot number detector means detecting the number of horizontal display dots by writing said display timing signal in the same address as that of said display data of said second memory means in synchronism with said dot clock; and
said reset means resetting said read address generator means upon readout of said display timing signal from said memory means.

4. A display control apparatus according to claim 2, said reset means having:
comparator means for comparing an output of said horizontal display dot number detector means with an output of said read address generator means and for outputting a reset signal to said read address generator means upon coincidence between the output of said horizontal display dot number detector means and the output of said read address generator means.

5. A display control apparatus according to claim 4, said horizontal display dot number detector means having:
a counter for counting said dot clocks during a write interval of said memory means; and
latch means for holding an output of said counter during a read interval of said memory means.

6. A display control apparatus according to claim 2, comprising:
said display data including display data of N (where N is an integer) colors;
said memory means including N first individual memory means having identical addresses assigned thereto;
display data of N colors being stored in identical addresses of said N first individual memory means for respective colors; and
said read address generator means generating said read address in synchronism with a clock having a frequency equivalent to N times that of said dot clock, and supplying said read address to said memory means.

7. A display control apparatus according to claim 6, said memory means further including a second individual memory means for storing said display timing signal, the same addresses as those of said display data being assigned to said second individual memory means.

8. A matrix display apparatus including matrix display means, display data memory means for storing therein data to be displayed on said matrix display means, and drive means for driving said matrix display means, said matrix display apparatus comprising:
(a) memory means for storing therein the display data;
(b) write address generator means for successively updating a write address in synchronism with the dot clock and for supplying the write address thus updated to said memory means;
(c) read address generator means for supplying a read address successively changed to said memory means;
(d) timing signal generator means responsive to a display timing signal supplied from outside to supply a timing signal for controlling the read/write switching of said memory means to said memory means, said write address generator means and said read address generator means;
(e) horizontal display dot number detector means for detecting the number of horizontal display dots from said dot clock and said display timing signal; and
(f) reset means for resetting the read address generator means upon coincidence between the read address signal outputted from said read address generator means and said number of horizontal display dots.

9. A matrix display apparatus according to claim 8, comprising:
said horizontal display dot number detector means including a second memory means having the same addresses as those of said memory means storing therein said display data assigned thereto, said horizontal display dot number detector means detecting the number of horizontal display dots by writing said display timing signal in the same address as that of said display data of said second memory means in synchronism with said dot clock; and
said reset means resetting said read address generator means upon readout of said display timing signal from said memory means.

10. A matrix display apparatus according to claim 8, said reset means having:
comparator for comparing an output of said horizontal display dot number detector means with an output of said read address generator means and for outputting a reset signal to said read address generator means upon coincidence between the output of said horizontal display dot number detector means and the output of said read address generator means.

11. A matrix display apparatus according to claim 10, said horizontal display dot number detector means having:
a counter for counting said dot clocks during a write interval of said memory means; and
latch means for holding an output of said counter during a read interval of said memory means.

12. A matrix display apparatus according to claim 8, comprising:
said display data including display data of N (where N is an integer) colors;
said memory means including N first individual memory means having identical addresses assigned thereto;
display data of N colors being stored in identical addresses of said N first individual memory means for respective colors; and
said read address generator means generating said read address in synchronism with a clock having a frequency equivalent to N times that of said dot clock, and supplying said read address to said memory means.

13. A matrix display apparatus according to claim 12, said memory means further including a second individual memory means for storing said display timing signal, the same addresses as those of said display data being assigned to said second individual memory means.

* * * * *